US012524377B2

(12) United States Patent
Godbole et al.

(10) Patent No.: US 12,524,377 B2
(45) Date of Patent: Jan. 13, 2026

(54) LOAD-BALANCING DATA PROTECTION TRAFFIC

(71) Applicant: Dell Products L.P., Round Rock, TX (US)

(72) Inventors: Ajey Godbole, Pune (IN); Poornima Gupte, Pune (IN); Vikas Chaudhary, Pune (IN); George Mathew, Belmont, CA (US); Donna Barry Lewis, Holly Springs, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/648,104

(22) Filed: Apr. 26, 2024

(65) Prior Publication Data
US 2025/0335398 A1 Oct. 30, 2025

(51) Int. Cl.
*G06F 16/174* (2019.01)
*G06F 16/14* (2019.01)

(52) U.S. Cl.
CPC ........ *G06F 16/1748* (2019.01); *G06F 16/152* (2019.01)

(58) Field of Classification Search
CPC ........................... G06F 16/1748; G06F 16/152
See application file for complete search history.

(56) References Cited

U.S. PATENT DOCUMENTS

| 11,269,734 | B2* | 3/2022 | Ramohalli Gopala Rao ............... G06F 16/285 |
| 11,973,823 | B1* | 4/2024 | Ghorpade ............ H04L 67/1097 |
| 2007/0282951 | A1* | 12/2007 | Selimis ................... H04L 67/75 709/205 |
| 2023/0153214 | A1* | 5/2023 | Sun ........................ G06F 3/0622 714/3 |
| 2024/0028466 | A1* | 1/2024 | Duggal ............... G06F 16/2246 |
| 2024/0037069 | A1* | 2/2024 | Mathew ............... H04L 61/4511 |
| 2024/0256232 | A1* | 8/2024 | Goyal .................... G06F 9/5038 |
| 2024/0256392 | A1* | 8/2024 | Shilane ............... G06F 11/1458 |
| 2024/0256485 | A1* | 8/2024 | Shilane ................ G06F 16/119 |
| 2024/0354201 | A1* | 10/2024 | Duggal ............... G06F 16/1748 |

* cited by examiner

*Primary Examiner* — Angelica Ruiz
(74) *Attorney, Agent, or Firm* — Staniford Tomita LLP

(57) ABSTRACT

A set of categories are associated to each service of a set of services of a deduplication filesystem hosted across a cluster of nodes. The categories describe loadings on the services. A preliminary identification of a service to which a client request should be redirected is made. Checks are made of the loadings on the service. The checking includes calculating thresholds for the categories, observing current values for the categories, comparing the current values against the thresholds, setting individual weights on the categories based on the comparison, and deriving a final weight for the service based on the individual weights. If the final weight indicates that the service is not overloaded, the request is redirected to the service. If the final weight indicates that the service is overloaded, the checking is iterated over a next service to find a service that is not overloaded.

18 Claims, 11 Drawing Sheets

| AoB Service | stream-weights |
|---|---|
| AoB-1 | High |
| AoB-2 | Low |
| AoB-3 | Low |

| AoB Service | cpu-memory-weights |
|---|---|
| AoB-1 | Low |
| AoB-2 | Low |
| AoB-3 | High |

| AoB Service | ddmost-clients-weights |
|---|---|
| AoB-1 | High |
| AoB-2 | Low |
| AoB-3 | Low |

| AoB Service | Historical-workload-weights |
|---|---|
| AoB-1 | Low |
| AoB-2 | Low |
| AoB-3 | Low |

LOAD-BALANCING DATA PROTECTION TRAFFIC

TECHNICAL FIELD

The present invention relates generally to information processing systems, and more particularly to large scale filesystems.

BACKGROUND

A distributed filesystem is a type of filesystem that spans multiple servers, but provides a unified view to clients accessing the filesystem. A deduplicated filesystem is a type of filesystem that seeks to reduce the amount of redundant data that is stored by storing only a single copy of data rather than multiple redundant copies. A deduplicated filesystem can be especially effective in a backup system because of the reduction in the number of duplicate copies of data that are stored. A cluster refers to a group of interconnected servers that work together to run an application as a single system. Clustering can improve performance, enhance availability, and provide scalability. Typical approaches to distributing incoming network traffic across multiple servers of a cluster do not recognize the unique characteristics and challenges posed when the application running in the cluster is a distributed deduplicated filesystem.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

A set of categories are associated to each service of a set of services of a deduplication filesystem hosted across a cluster of nodes. The categories describe loadings on the services. A preliminary identification of a service to which a client request should be redirected is made. Checks are made of the loadings on the service. The checking includes calculating thresholds for the categories, observing current values for the categories, comparing the current values against the thresholds, setting individual weights on the categories based on the comparison, and deriving a final weight for the service based on the individual weights. If the final weight indicates that the service is not overloaded, the request is redirected to the service. If the final weight indicates that the service is overloaded, the checking is iterated over a next service to find a service that is not overloaded.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 8 shows a table holding current values observed for a category, according to one or more embodiments.

FIG. 9 shows a table holding current values observed for another category, according to one or more embodiments.

FIG. 10 shows a table holding current values observed for another category, according to one or more embodiments.

FIG. 11 shows a table holding current values observed for another category, according to one or more embodiments.

DETAILED DESCRIPTION

Figure 1:
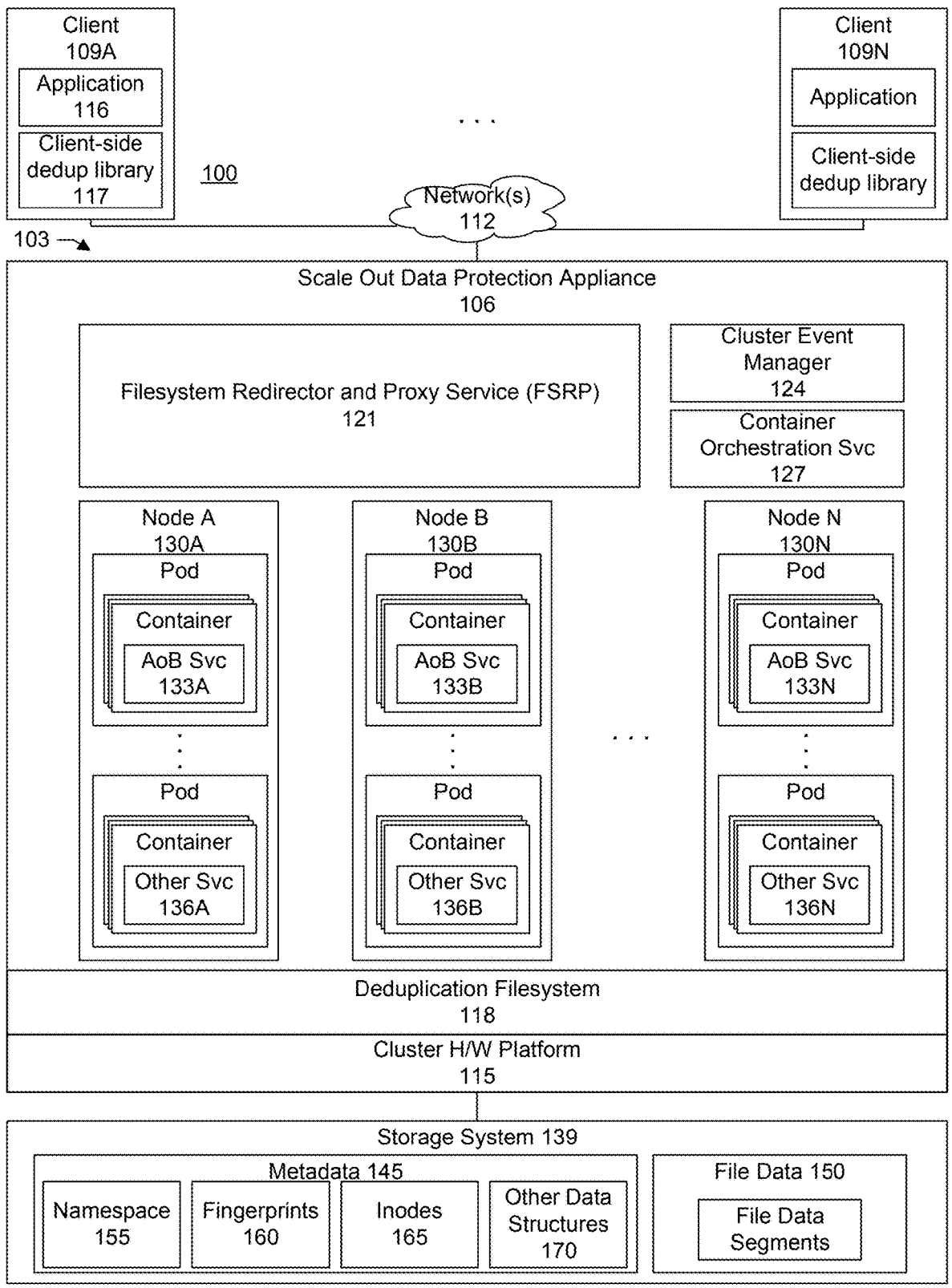
FIG. 1 shows a block diagram of an information processing system that load-balances data protection traffic in a deduplication filesystem, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a block diagram of a system 100 within which methods and systems for load-balancing data protection traffic may be implemented. An information processing system 103 includes a scale-out data protection appliance 106. A set of clients 109A-N are connected via a network 112 to the data protection appliance. The data protection appliance is responsible for managing and storing data (e.g., files) backed up from the clients. The system includes a set of distributed components and services supported by an underlying cluster hardware platform 115. The hardware platform may include memory and processors, among other hardware components. The clients, such as client 109A, may include an application 116 and a client-side deduplication library 117 installed at the clients. The application may include, for example, a backup application. The client-side deduplication library is positioned between the client application and data protection appliance and exposes an interface to the client application through which services of the data protection appliance may be made available.

In an embodiment, the data protection appliance includes a deduplication filesystem 118, filesystem redirector and proxy service (FSRP) 121, cluster event manager (CEM) 124, container orchestration service 127, and nodes 130A-N hosting services of the filesystem. Such services may include access object (AoB) services 133A-N among other services 136A-N. The nodes may be physical or virtual nodes. A cluster may have a combination of physical and virtual nodes. The filesystem is connected to a storage system 139 that provides persistent storage for the services, files managed by the filesystem, and metadata structures organizing the files.

The load-balancing technique helps to prevent the overloading of components and, in particular, the AoBs in the data protection appliance. Avoiding overloading of the AoBs helps to improve the overall performance of the data protection appliance. The filesystem redirector and proxy service tracks the jobs currently running in the cluster using an in memory data structure. The information tracked can be used to determine whether or not a particular AoB is overloaded and should thus be excluded from handling a redirection request; or not overloaded and thus should be considered for handling a redirection request.

In an embodiment, the filesystem redirector and proxy service applies a consistent hashing algorithm to determine which access object service should handle a particular filesystem operation on a file that has been requested by a client. The determination includes applying multiple weights associated with categories describing the types of loadings imposed on the AoBs. In an embodiment, a weight indicates a probability or likelihood of an AoB service being selected to handle the requested operation. For example, if there is a high load on the AoB service (e.g., high number of file operations), then the probability of using that AoB service for redirection is accordingly "low." The determination further considers the computing resources of a particular node hosting a particular AoB. For example, a cluster may have any number of heterogeneous nodes. Heterogeneous nodes are nodes having differing levels of compute power or resources. An AoB hosted by a node having a large amount of computing power can have a greater capacity than an AoB hosted by a node having a relatively smaller amount of computing power. Each year there are advancements in computing capability and power. A cluster of heterogeneous nodes can be the result new nodes (with new advanced hardware) being added to the cluster over time. A technique of the load-balancing algorithm accounts for these new computing capabilities to properly distribute load.

In an embodiment, the filesystem includes a set of microservices distributed across multiple nodes of a cluster. The services or microservices include the FSRP service and access object services hosted across the nodes of the cluster. The services are managed by the container orchestration service. An example of a container orchestration service is Kubernetes. Kubernetes is an open-source container-orchestration system for automating computer application deployment, scaling, and management. The data protection appliance may be referred to as a scale-out data protection appliance as filesystem services can be quickly scaled up or down based on demand.

A container is a virtualized computing environment that runs an application program as a service or, more specifically, microservice. Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications may be run by containers as microservices with the container orchestration service facilitating scaling and failover. For example, the container orchestration service can restart containers that fail, replace containers, kill containers that fail to respond to health checks, and withhold advertising them to clients until they are ready to serve.

In an embodiment, the filesystem services or microservices run inside the virtualized environment provided by the orchestration service as containers. One or more containers may be grouped into a group that may be referred to as a pod. Pods can run one or more containers that share the same network namespace, storage, and other resources. The filesystem services can run on one or multiple physical or virtual nodes. The filesystem can be run on premises with dedicated hardware or in a public cloud environment.

The cluster event manager communicates with the container orchestration service to monitor the cluster including cluster membership and, more particularly, identifications of AoB instances that are currently active or available in the cluster. The FSRP service may subscribe to cluster event notifications generated by the cluster event manager. Such notifications apprise the FSRP service of membership changes to the cluster such as an instance of an AoB service being added to the cluster or an instance of an AoB service being removed from the cluster. The FSRP service tracks the AoB services that are currently available or active in the cluster so that client requests can be properly redirected to an AoB service that is available or active.

The filesystem receives data protection workload or other filesystem requests from the clients, processes the requests, and returns results of the processing back to the clients. The storage system stores data written to and generated by the filesystem including metadata 145 and client or user file data 150. Metadata includes a namespace 155, fingerprints 160, and inodes 165, among other data structures 170.

The filesystem provides a way to organize data stored in a storage system and present that data to clients and applications in a logical format. The filesystem organizes the data into files and folders into which the files may be stored. When a client requests access to a file, the filesystem issues a file handle or other identifier for the file to the client. The client can use the file handle or other identifier in subsequent operations involving the file. The namespace of the filesystem provides a hierarchical organizational structure for identifying filesystem objects through a file path. A file can be identified by its path through a structure of folders and subfolders in the filesystem. A filesystem may hold many hundreds of thousands or even many millions of files across many different folders and subfolders and spanning thousands of terabytes.

In an embodiment, any AoB can handle namespace operations and file access, but different AoBs may be assigned responsibility for different ranges of files. Based on a hash of a file handle, path, or other information associated with a file, the filesystem redirector and proxy services attempts to redirect or route associated data protection traffic to a particular access object service in a consistent manner so that future writes and/or reads of the same file are routed consistently to the same access object service. Consistent routing or redirection by FSRP enables the AoBs to cache state in memory that may be reused for other accesses. Consistent routing further helps to reduce locking, coordination, and collision issues among different AoBs because each AoB can operate on its assigned range of files independent of another AoB that may be assigned a different range of files. An AoB attempts to keep necessary state in memory for efficiency. The state, however, is globally available and can be handled by other AoB instances in case of an instance failure. The files or, more particularly, file handle hash ranges can be dynamically reassigned to the AoBs to maintain a balance across currently available AoBs.

Figure 2:
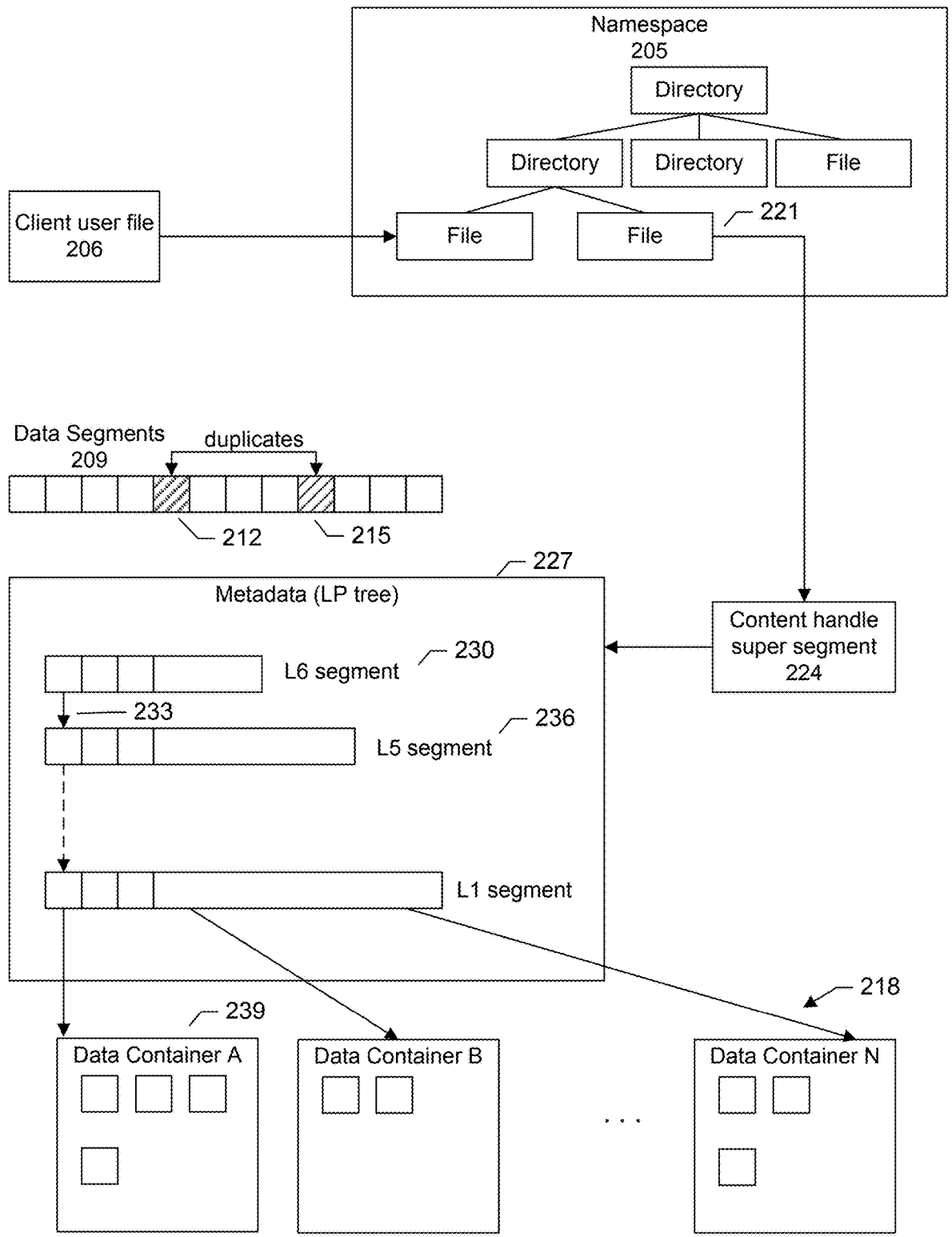
FIG. 2 shows an example of a deduplication process, according to one or more embodiments.

In an embodiment, the filesystem is a deduplicated filesystem. FIG. 2 shows a block diagram illustrating a deduplication process of the filesystem according to one or more embodiments. A deduplicated filesystem is a type of filesystem that can reduce the amount of redundant data that is stored. As shown in the example of FIG. 2, the filesystem maintains a namespace 205. Further details of a filesystem namespace are provided in FIG. 3 and the discussion accompanying FIG. 3.

As data, such as incoming client user file 206, enters the filesystem, it is segmented into data segments 209 and filtered against existing segments to remove duplicates (e.g., duplicate segments 212, 215). A segment that happens to be the same as another segment that is already stored in the filesystem may not be again stored. This helps to eliminate redundant data and conserve storage space. Metadata, however, is generated and stored that allows the filesystem to reconstruct or reassemble the file using the already or previously stored segment. Metadata is different from user data. Metadata may be used to track in the filesystem the location of the user data within a shared storage pool. The amount of metadata may range from about 2 or 4 percent the size of the user data.

More specifically, the filesystem maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 218. There can be many millions of containers tracked by the filesystem. The fingerprint index is updated with the fingerprints corresponding to the newly stored data segments. A content handle 221 of the file is kept in the filesystem's namespace to support the directory hierarchy. The content handle points to a super segment 224 which holds a reference to a top of a segment tree 227 of the file. The super segment points to a top reference 230 that points 233 to metadata 236 and data segments 239.

Thus, in a specific embodiment, each file in the filesystem may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes. In an embodiment, segments in the filesystem are identified by 24 byte keys (or the fingerprint of a segment), including the LP segments. Each LP segment contains references to lower level LP segments.

Figure 3:
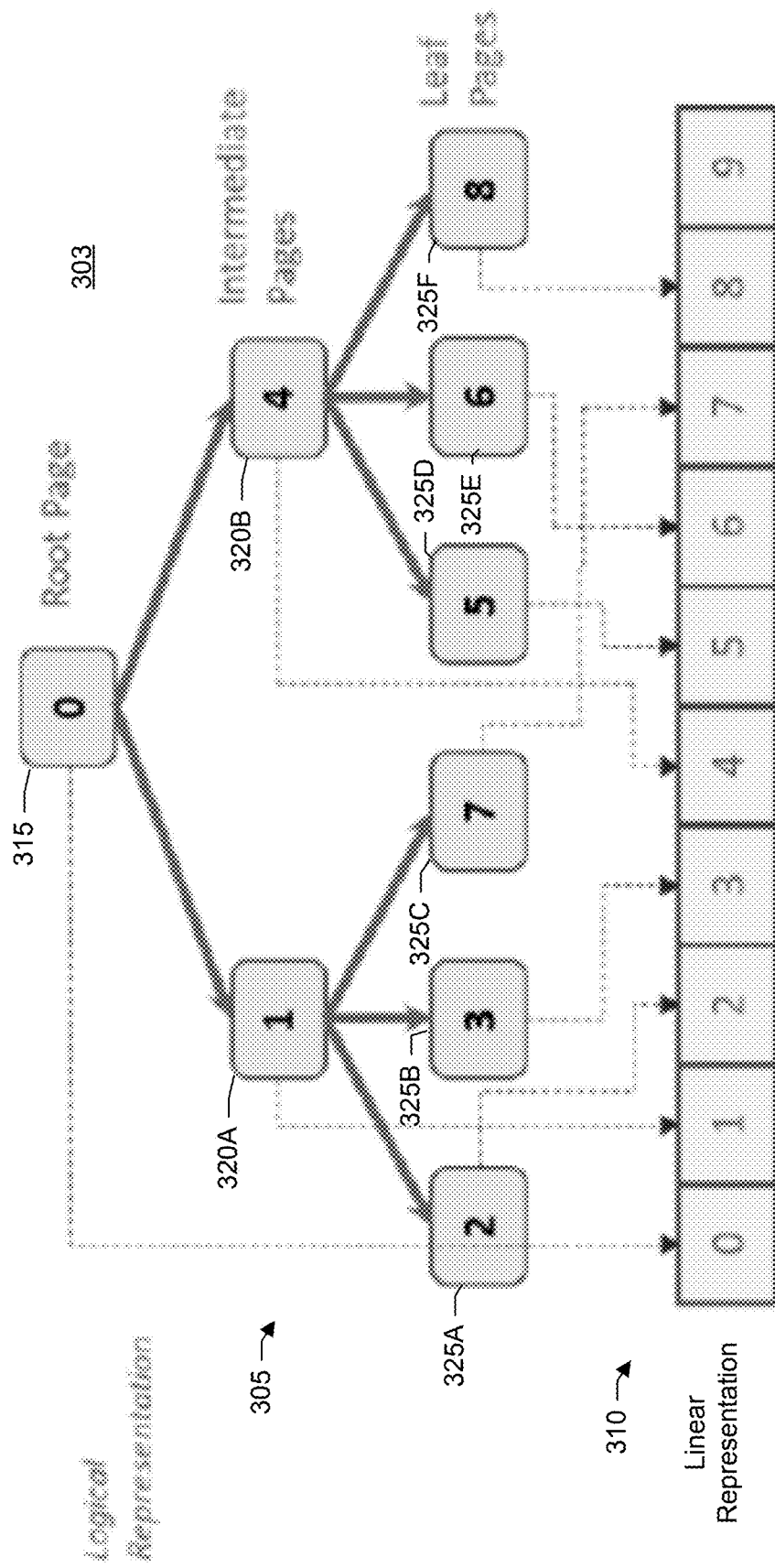
FIG. 3 shows an example of a tree data structure of the namespace, according to one or more embodiments.

FIG. 3 shows further detail of a namespace of the filesystem. In an embodiment, the namespace is represented by a B+ tree data structure where pages of the tree are written to a key-value store. Page identifiers form the keys of the key-value store and page content form the values of the key-value store. The tree data structure includes the folder and file structure as well as file inodes. FIG. 3 shows an example of a B+ Tree 303 in a logical representation 305 and a linear representation 310. In this example, there is a root page 315, intermediate pages 320A,B, and leaf pages 325A-F. The broken lines shown in FIG. 3 map the pages from their logical representation in the tree to their representation as a linear sequential set of pages on disk, e.g., flattened on-disk layout. In other words, the tree may be represented as a line of pages of data.

The intermediate pages store lookup keys that reference other intermediate or leaf pages. An intermediate page may be referred to as an INT page and references other INT pages or leaf pages by interior keys.

The leaf page contains "key/value" pairs. In an embodiment, a B+ Tree key is a 128-bit number kept in sorted order on the page. It is accompanied by a "value," which is an index to data associated with that key and may be referred to as a "payload." In an embodiment, the 128-bit key includes a 64-bit PID, or parent file ID (the ID of the directory that owns this item), and a 64-bit CID, or child file ID. In an embodiment, the leaf page stores a key for each file in the filesystem. The key references a payload identifying an inode number of the file and thus a pointer to content or data of the file. There can be another key for each file that identifies a name of the file.

Figure 4:
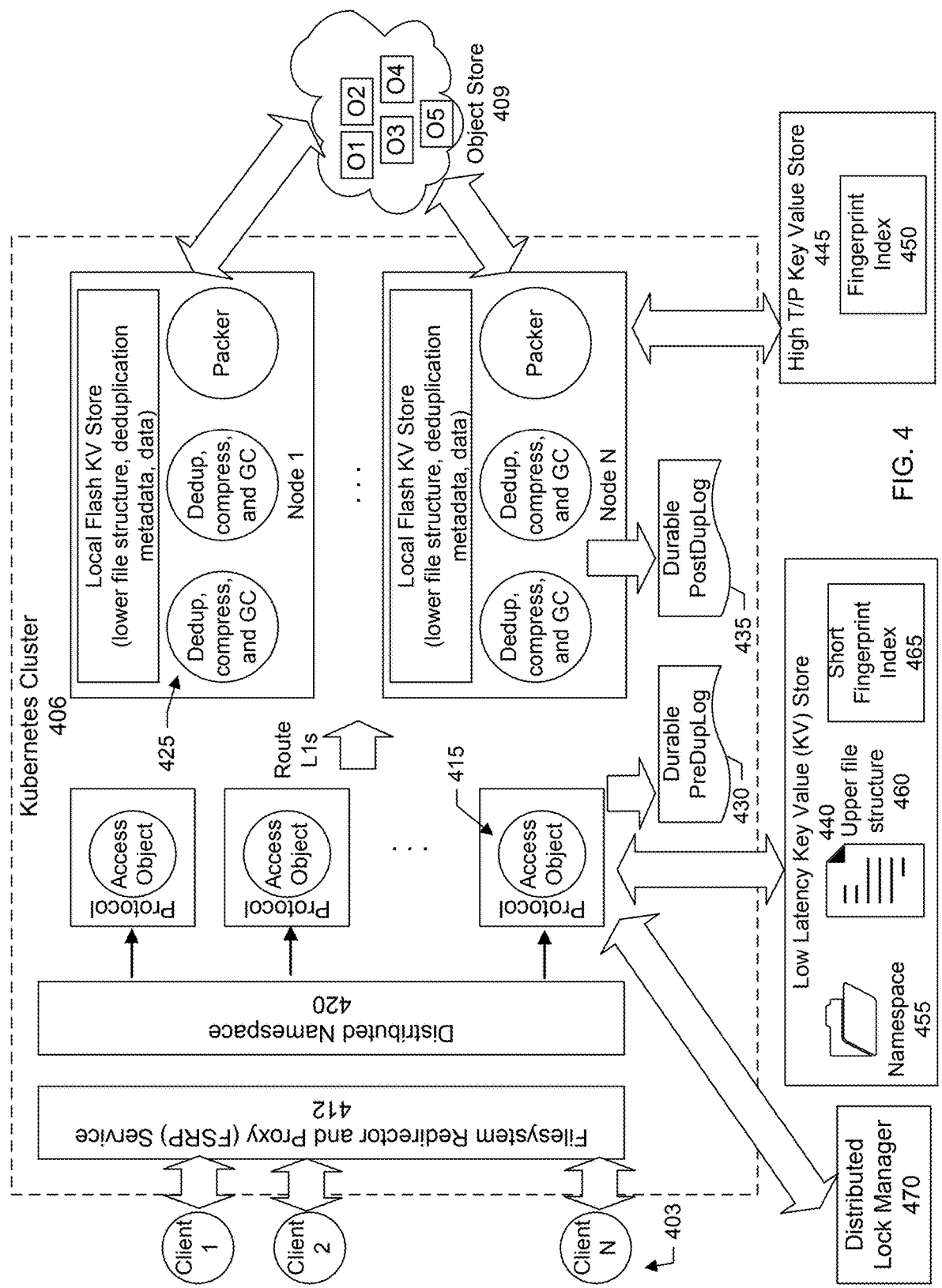
FIG. 4 shows an architecture of the deduplication filesystem, according to one or more embodiments.

FIG. 4 shows an example of an architecture having the FSRP service, according to one or more embodiments. The example shown in FIG. 4 includes a set of clients 403, a cluster 406 at which a deduplicated filesystem is hosted across nodes of the cluster, and an object store 409 storing file data segments that have been packed into objects. As discussed, in an embodiment, the cluster is a Kubernetes cluster where the filesystem is provided as a set of microservices. The cluster includes FSRP 412 and a set of nodes hosting a set of AoBs 415 across which a namespace 420 is distributed. AoBs may handle namespace operations, file access requests, file creation, folder creation, file reads, and file writes. AoBs are responsible for operations involving upper levels of the tree data structures representing the files.

There is another set of nodes hosting other services 425 that handle lower levels of the tree or file structures, such as the L1-L0 segments. Such services may include services for deduplication, compression, garbage collection, and packing of file segments into objects for storage in the object store. The AoBs route the lower level segments including L1s to these other backend services for further processing, e.g., deduplication, compression, and packing.

Operations and activities of the services may be recorded in a log. There can be a durable pre-deduplication log 430 used by the AoBs and a durable post-deduplication log 435 used by the backend services. The logs can be used to allow operations to resume following an interruption of a particular service instance.

A key value store may be used to store metadata of the filesystem. There can be a low latency key value store 440 used by the AoBs and a high throughput key value store 445 used by the backend deduplication, compression, garbage collection, and packing services. The high throughput key value store stores a fingerprint index 450. The low latency key value store stores a namespace 455, upper file structure (e.g., upper segment tree levels) 460, and a short fingerprint index 465.

There can be a distributed lock manager 470 to coordinate file and folder updates by the AoBs to the Btree structure holding the namespace. When an AoB needs to make an update, the AoB acquires from the distributed lock manager a lock on one or more pages of the tree structure and makes the updates.

The filesystem supports multiple network protocols for accessing the data stored and managed by the filesystem. Such protocols include Data Domain Boost ("Boost" or "DDBoost"), Network Filesystem (NFS), and Amazon Simple Storage Service (S3), among others. DDBoost is a system that distributes parts of a deduplication process to the application clients, enabling client-side deduplication for faster, more efficient backup and recovery.

In an embodiment, the clients use the DDBoost backup protocol to conduct backups of client data to the storage system, restore the backups from the storage system to the clients, or perform other data protection operations. A DDBoost client library exposes application programming interfaces (APIs) to integrate with the storage system. These API interfaces exported by the DDBoost library provide mechanisms to access or manipulate the functionality of the Data Domain filesystem, as provided by Dell Technologies. Embodiments may utilize the DDBoost Filesystem Plug-In (BoostFS), which resides on the client application system and presents a standard filesystem mount point to the application. With direct access to a BoostFS mount point, the application can leverage the storage and network efficiencies of the DDBoost protocol for backup and recovery. Some embodiments are described in conjunction with the DDBoost protocol, PowerProtect Backup Appliance, and Data Domain filesystem as provided by Dell Technologies. It should be appreciated, however, that principles and aspects discussed can be applied to other filesystems, filesystem protocols, and backup storage systems.

In an embodiment, the data protection system is built on a Kubernetes PaaS (Platform as a Service). The filesystem redirection proxy (FSRP) is a service which is the entry point for a data-path. At the start of backup/restore operations, the clients (e.g., Boost clients) talk with the FSRP service to obtain an Internet protocol (IP) address identifying an access object service to handle the requested operation. FSRP returns an IP address of a particular access object service to the requesting client. The client can then connect directly to the particular access object service to complete the processing of their requested operation. The subsequent direct connection between the client and particular access object service, thereby bypassing FSRP, can result in FSRP not being acutely aware of how busy or loaded the particular access object service is. A further discussion of FSRP is provided in U.S. patent application Ser. No. 18/428,717, filed Jan. 31, 2024, which is incorporated by reference along with all other references cited.

In a customer's environment, there can be many Boost clients protecting their workloads on a single data protection appliance. In some cases, the Boost client numbers can be in the thousands. Hence it is desirable that the scale-out data protection appliance be able to seamlessly serve the enormous number of requests that may be issued from all Boost clients. There is a need for the FSRP service to load-balance the data protection traffic in the scale out data protection appliance such that none of the access object (AoB) services in the scale out appliance are overloaded.

Figure 5:
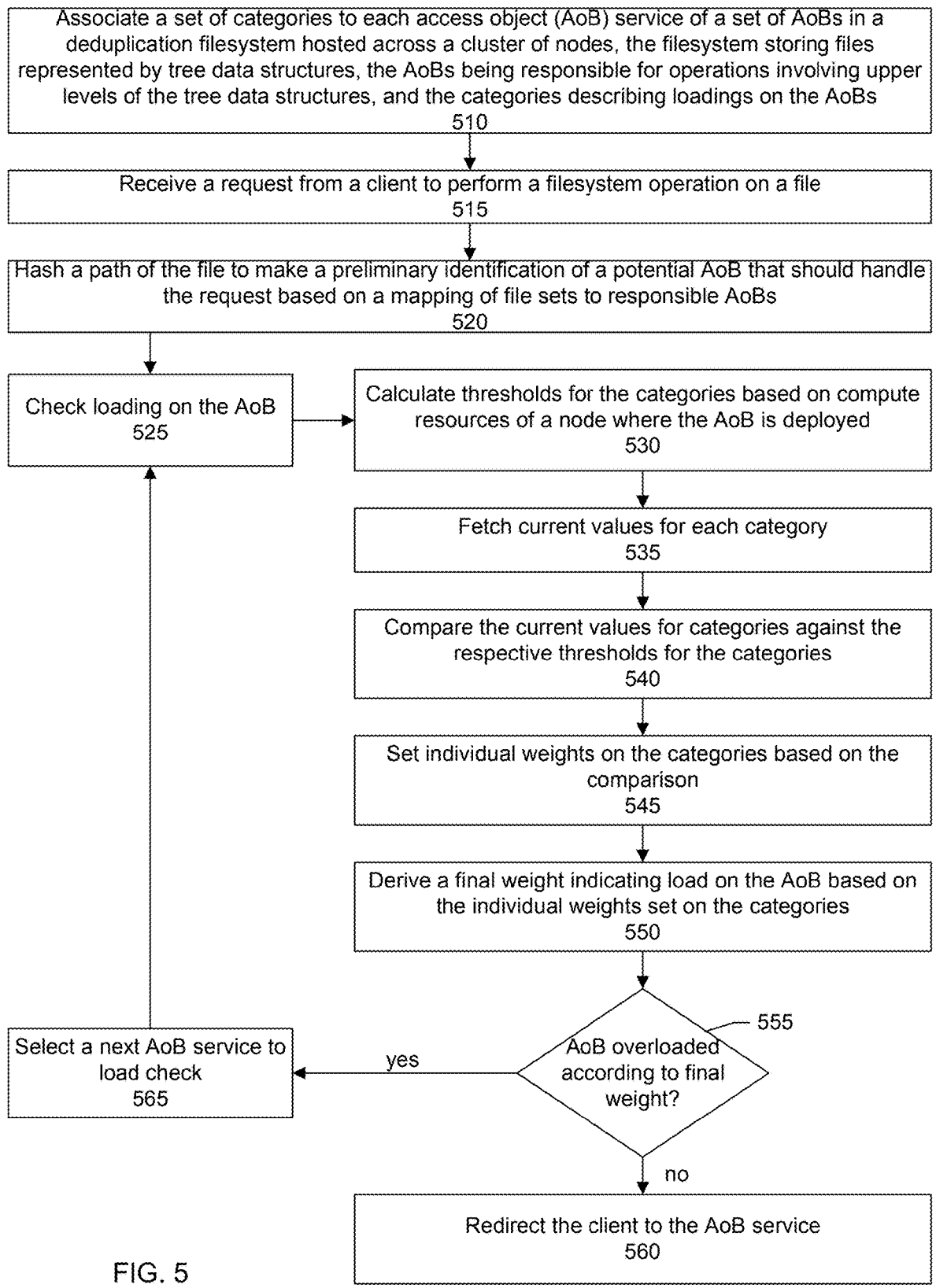
FIG. 5 shows a flow for load-balancing data protection traffic, according to one or more embodiments.

FIG. 5 shows an overall flow for load-balancing, according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 510, a set of categories are associated to each access object service of a set of access object (AoB) services in a deduplication filesystem hosted across a cluster of nodes. In an embodiment, the filesystem stores files represented by tree data structures. The AoBs are responsible for operations involving upper levels of the tree data structures. The categories describe or group types of loadings that may be placed on the AoBs.

In a step 515, a request is received from a client to perform a filesystem operation on a file.

In a step 520, a path, file handle, or other identifier associated with the file is hashed to make a preliminary identification of a potential access object service that should handle the request based on a mapping of file sets or file hash ranges to responsible AoBs. In other words, in an embodiment, a mapping is maintained of hash ranges to AoB services, where each AoB service is responsible for a respective hash range. A file handle or other identifier associated with the file is hashed to obtain a hash value. The hash value is cross-referenced against the mapping to identify a particular AoB service having responsibility for the hash range within which the hash value falls. Before redirecting the request, however, a check of the AoB is made to determine whether or not the AoB is overloaded. If the AoB is overloaded, the request may be redirected to a different AoB that is not overloaded.

More particularly, in a step 525, loading checks are triggered on the AoB. The loading checks provide visibility to the filesystem redirector and proxy service on how busy the AoB service is and the capacity of the AoB service to handle load based on compute resources of a node hosting the AoB service. The loading checks may be accomplished by issuing queries to the AoB or other management service of the cluster, e.g., container orchestration service.

Specifically, in a step 530, thresholds are calculated for the categories based on compute resources of a node where the AoB service has been deployed. In a step 535, current values for each category are fetched, measured, or observed. In a step 540, the current values for the categories associated with the AoB service are compared against respective thresholds for the categories. In a step 545, individual weights or scores are set on the categories based on the comparison.

In a step 550, a final weight or score is derived for the AoB service based on the individual weights set on the categories associated with the AoB service.

In a step 555, a determination is made as to whether the AoB service is overloaded according to the final weight. If the AoB service is not overloaded, the client is redirected to the AoB service for the processing of the request (step 560).

If, however, the AoB service is overloaded according to the final weight, FSRP iterates the load checks over one or more next AoB services to find an AoB service that is not overloaded (step 565).

In an embodiment, the load checks of each AoB service may be performed independent of receiving the client request. For example, the load checks may be performed as a background process or periodically such as every minute or at any other frequency. Performing the load checks periodically and before any client request is received helps to ensure that up-to-date information concerning loads on the AoBs is immediately available when a client request is received and thus improve the AoB redirection response time.

In an embodiment, a technique provides a method to load-balance the data protection traffic in the scale-out data protection appliance such that none of the components/access object (AoB) services in the scale-out appliance are overloaded. In an embodiment, a consistent hashing algorithm uses multiple weights which enables the filesystem redirector and proxy (FSRP) service to avoid overloading any of the access object (AoB) services running on the appliance and thus boosting the performance of the data protection appliance.

In an embodiment, the consistent hashing algorithm considers the total number of AoB services currently running on the nodes of the scale-out protection appliance. The appliance nodes can be heterogeneous ones where each node can contain processors or devices with different bandwidth and computational capabilities. For example, there can be a few nodes in the scale-out appliance which can have twice the power compared to the rest of the nodes.

The FSRP consistent hashing algorithm load-balances the data projection traffic in the scale-out data protection appliance by performing the following two steps sequence:

1) AoB selection: the FSRP consistent hashing algorithm hashes the file path, directory or storage unit name specified as input to identify an AoB service for redirection. For a given file path, directory or storage-unit, the FSRP consistent hashing algorithm consistently selects the same AoB service provided there is no change in AoB membership details.

2) Check for non-overloaded AoB: Post (or after) selecting the AoB service, the FSRP hashing algorithm checks multiple weights associated with selected AoB to understand if the selected AoB service is currently not overloaded and can be used for redirection. If any/multiple weights are observed as "low," the FSRP consistent hash algorithm considers this AoB service to be an overloaded service and skips the AoB service for redirection. The FSRP hashing algorithm iterates through the available AoB list to identify an AoB whose associated weights are observed to be "high" and thus not an overloaded service.

In an embodiment, the hashing algorithm uses the following weights, categories, or factors to identify or determine if the AoB service is an overloaded service:

1) The total number of active file operations being serviced by the AoB service, e.g., Availability of the read/write/replication streams on the AoB service.

2) CPU/Memory/Network/Disk utilization of the AoB service.

3) Total number of DDBoost client requests currently served by the AoB service.

4) Current scale out protection appliance workload.

5) Historical workload served by the AoB service earlier at that time of the day/time of the week/month.

In an embodiment, historical workload refers to past activity patterns of an AoB service. The system tracks information such as the time, day, week, month, and duration of workloads or activities handled by the AoB service. In many cases, an AoB service may encounter or process workloads that occur at regular periodic intervals. For example, organizations typically conduct backups according to a schedule (e.g., full backups every Sunday). The tracking of such activity patterns can be used to infer, predict, or forecast when an AoB service may need to dedicate resources to handle a scheduled workload. If a client request happens to be received within a time window of when the scheduled workload is expected to occur, the AoB service may encounter an overload situation if it is handling both the scheduled or expected workload and client request. Thus, the historical workload category associated with an access object service may be marked as "low" when a time of a client request falls within a time window or time period of a historical workload previously handled by the access object service even if the access object service has not yet started a new workload corresponding to the historical workload. This helps to ensure that the access object service is not selected for redirection as in some cases there can be a slight delay in starting the new workload.

The load-balancing technique uses a consistent hashing algorithm along with weights to load-balance the data protection traffic in the scale out data protection appliance such that none of the AoB services are overloaded and thus boosting the performance of the appliance.

In an embodiment, the FSRP consistent hashing algorithm uses the specified file path/directory/storage-unit name to select an AoB service for redirection. The algorithm ensures that it will select same AoB service for redirection for a given file path/directory/storage-unit provided there is no change in AoB membership details. Post identifying the AoB, it further checks that the AoB service is not overloaded by using multiple weights associated with the AoB service.

The subsequent sections describe details of each of the weights associated with the AoB that can be used by the consistent hashing algorithm to determine whether the AoB service is overloaded. The following discussion provides details of the weights:

1) Weight associated with availability of the read/write/replication streams counts on the AoB service: The FSRP consistent algorithm checks for weight associated with the read/write/replication stream counts to determine if the AoB service is overloaded. The current availability of streams on the AoB service is one of the criteria used by the FSRP consistent hashing algorithm to understand whether the AoB can be selected by the FSRP for redirection. A threshold value is computed for each AoB service based on its computed power which specifies the maximum of read/write/replication stream counts that can be served by the AoB service.

A periodic probe checks for the total number file operations currently served by the AoB service. If the total number of file operations served is equal to or more than threshold, the periodic probe sets the weight as "low" for the overloaded AoB service. The FSRP consistent hashing algorithm excludes this AoB service for redirection requests if this weight is observed as "low." In case the periodic probe observes that the total number of file operations served by the AoB service is less than AoB service's threshold value, the periodic probe will reset the overload weight enabling this service to be selected for redirection requests. That is, the algorithm restarts mapping files to this service.

2) Weight associated with CPU/memory/network/disk utilization of the AoB services: The FSRP consistent hashing algorithm checks for weight associated with CPU/memory/network/disk utilization of the AoB service to determine whether the AoB service is overloaded. The AoB pod's current CPU, memory, network and disk utilization is one of the criteria used by the FSRP consistent hashing algorithm to understand whether the AoB service can be selected by the FSRP for redirection. A threshold value is computed for each AoB based on its computed power which specifies the maximum CPU/memory/network/disk utilization supported by the AoB service.

A periodic probe checks for the AoB's current CPU/memory/network/disk utilization. If it is found to be equal to or more than threshold value, the period probe sets the weight as "low" for the overloaded AoB service. The FSRP consistent hashing algorithm excludes this AoB service for redirection requests if this weight is observed as "low." In case the periodic probe observes that the CPU/memory/network/disk utilization of the AoB service is less than AoB service's threshold value, the periodic probe resets the overload weight enabling this service to be selected for redirection requests. That is, the algorithm restarts mapping files to this service.

3) Weight associated with total number of (DDBoost) client requests currently served by the AoB service: The FSRP consistent hashing algorithm checks for weight associated with the total number of DDBoost client requests currently served by the AoB service to determine whether the AoB service is overloaded. The total number of DDBoost client requests currently served the AoB services is one of the criteria used by the FSRP consistent hashing algorithm to understand whether the AoB service can be selected by the FSRP for redirection. A threshold value is computed for each AoB to understand total number of DDBoost client requests supported by the AoB service.

A periodic probe checks for the total number of DDBoost client requests currently served by the AoB service. If it is found to be equal to or more than threshold value, the period probe sets the weight as "low" for the overloaded AoB service. The FSRP consistent hashing algorithm excludes this AoB service for redirection requests if this weight is observed as "low." In case the periodic probe observes that total number of DDBoost client requests is less than threshold, the periodic probe resets the overload weight enabling this service to be selected for redirection requests. That is, the algorithm restarts mapping files to this service.

4) Weight associated with current scale out protection appliance workload: The FSRP consistent hashing algorithm checks for weight associated with the current scale out protection appliance workload to determine whether the AoB service is overloaded. The AoB's parameters such as read throughput, write throughout, protocol latency, protocol load percentage, protocol wait time, network throughput, and the like is measured to understand whether the AoB service can be selected by the FSRP for redirection. A threshold value is computed for each AoB based on its computed power which specifies the maximum read throughput, write throughout, protocol latency, protocol load percentage, protocol wait time, and network throughput supported by the AoB service.

A periodic probe checks for the current read throughput, write throughput, protocol latency, protocol load percentage, protocol wait time, and network throughput of the AoB service. If it is found to be equal to or more than threshold value, the period probe sets the weight as "low" for the overloaded AoB service. The FSRP consistent hashing algorithm excludes this AoB service for redirection requests if this weight is observed as "low." In case the periodic probe observes that read throughput, write throughout, protocol latency, protocol load percentage, protocol wait time, network throughput is less than threshold, the periodic probe resets the overload weight enabling this service to be selected for redirection requests. That is, the algorithm restarts mapping files to this service.

5) Weight associated with historical workload served by the AoB service earlier at that time of the day/time of the week/month: The FSRP consistent hashing algorithm checks for weight associated with historical workload served by the AoB service earlier at that time of the day/time of the week/month. For example, multiple full backups are usually scheduled to run on weekends. Thus, services may observe or experience a heavier workload than usual. Details of each of these backups are stored in persistent storage for reference. This workload data may include details such as stream count used during backup, memory and CPU utilized and client counts for each of the AoB services. A threshold value is calculated based on the stream counts used by the AoB service, memory and CPU that are to be utilized by the AoB service and clients that are to be served by the AoB service.

A periodic probe checks for these historical workload details. If it is found to be equal to or more than threshold value, the period probe sets the weight as "low" for the overloaded AoB service. The FSRP consistent hashing algorithm excludes this AoB service for redirection requests if this weight is observed as "low." In case the periodic probe observes that these historical workload details are less than threshold, the periodic probe resets the overload weight enabling this service to be selected for redirection requests. That is, the algorithm restarts mapping files to this service.

Figure 6:
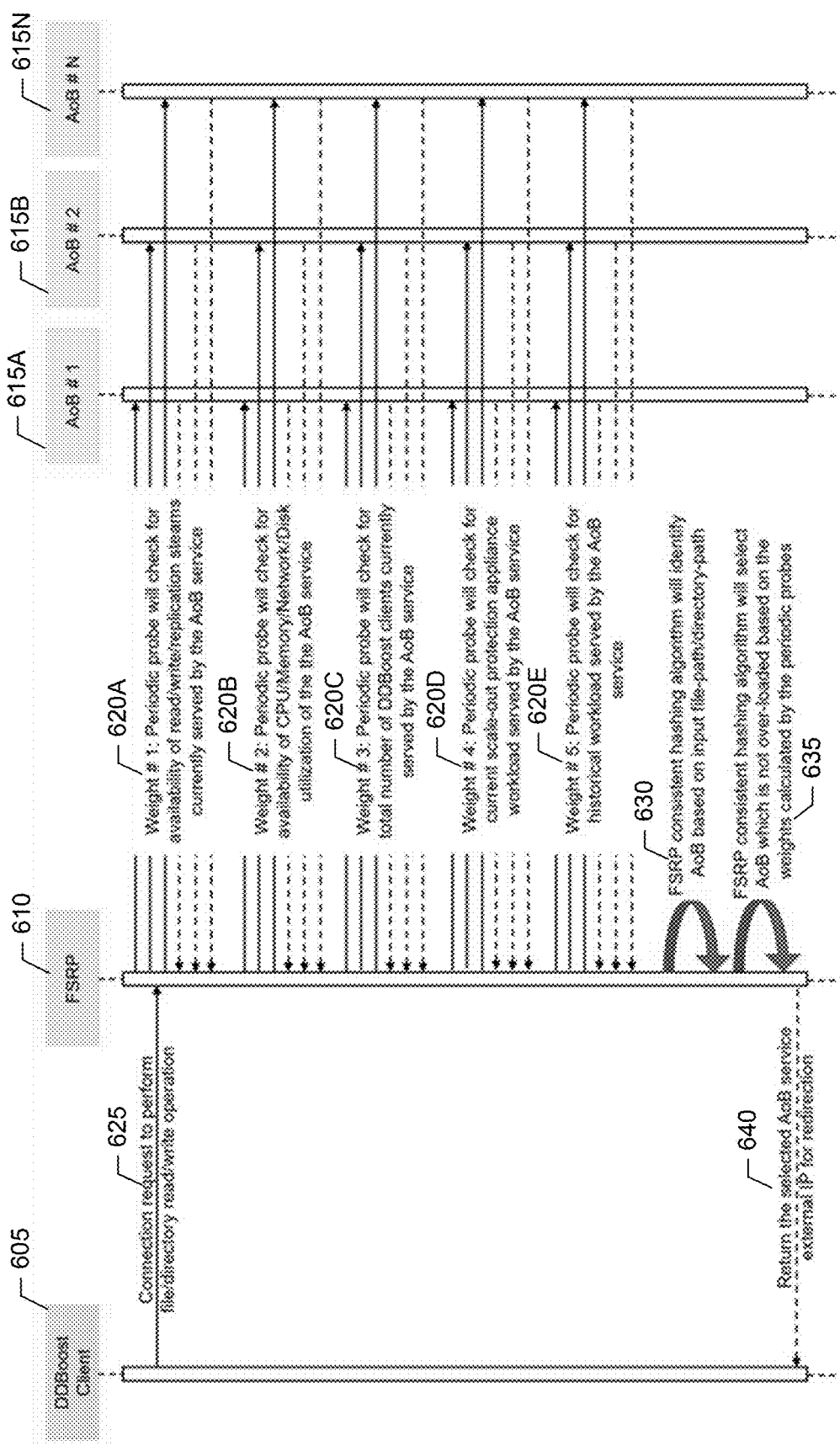
FIG. 6 shows a sequence diagram for load-balancing data protection traffic, according to one or more embodiments.

FIG. 6 shows a sequence diagram on how the FSRP consistent hashing algorithm uses the fetched details concerning AoB loadings to determine the AoB service to select for redirection in order to load-balance the data protection traffic. The entities shown in FIG. 6 include a client 605, FSRP 610, and any number of AoB services 615A-N.

In steps 620A-E, periodic probes query the AoBs to gather metrics concerning the weights or loadings being carried by the AoBs. In an embodiment, there are five different categories or types of weights. A first weight or category describes the availability of read/write/replication streams currently served by an AoB service. A second weight or category describes the availability of CPU/memory/network/disk utilization by the AoB service. A third weight or category describes the total number of clients currently being served by the AoB service. A fourth weight or category describes the current workload served by the AoB service (e.g., number of jobs the AoB service is currently processing). A fifth weight or category describes the historical workloads served by the AoB service.

In a step 625, the client issues connection request to perform a filesystem operation (e.g., read or write) on a file or directory. The request is received by the FSRP. In a step 630, the file-path/directory-path is provided as input to the FSRP consistent hashing algorithm which returns a hash value. A preliminary identification of an AoB is made based on the hash value by cross-referencing the hash value to the hash value ranges assigned to the AoBs. It is possible, however, that the AoB responsible for that particular hash value range is overloaded. Thus, in a step 635, the FSRP consistent hashing algorithm selects an AoB that is not over-loaded based on the weights calculated by the periodic probes (steps 620A-E). In a step 640, an external IP address identifying the AoB service selected by FSRP is returned to the client for redirection.

As discussed, the selected AoB service may be the same AoB service previously identified based on a hash of the file handle if that AoB service is not overloaded. Alternatively, the selected AoB service may be a different AoB service (e.g., different instance of the AoB service) if the previously identified AoB service (based on the hash of the file handle) is found to be overloaded. In an embodiment, a single IP address identifying the selected AoB service is returned to the client for the redirection. In another embodiment, multiple IP addresses identifying multiple AoB services are returned to the client. Returning multiple IP addresses for redirection is further discussed in U.S. patent application Ser. No. 18/648,121, filed Apr. 26, 2024, which is incorporated by reference along with all other references cited.

Figure 7:
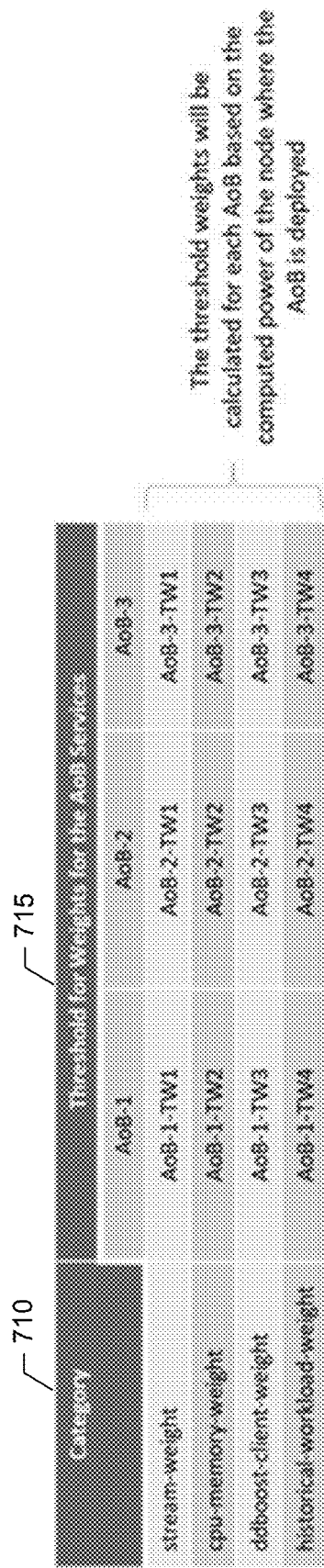
FIG. 7 shows a table holding threshold weights for categories associated with access object services, according to one or more embodiments.

FIGS. 7-12 show graphical representations of how FSRP load-balances the data protection traffic. FIG. 7 shows a table 705 to collect threshold weights for different loading or weight categories associated with the AoBs. A first column 710 lists the categories of weights associated with the AoBs. For example, as discussed, a first category may describe a number of stream counts associated with an AoB service. A second category may describe CPU, memory, network, and disk utilization associated with the AoB service. A third category may describe a number of client requests associated with the AoB service. A fourth category may describe historical workloads associated with the AoB service, and so forth.

Second columns 715 list the AoB services and threshold weights of each category. The threshold weights may be calculated based on the computing power of a node where a respective AoB service is deployed. For example, a first AoB-1 has a threshold stream weight of AoB-1-TW1, a CPU-memory weight of AoB-1-TW2, a client weight of AoB-1-TW3, and a historical workload weight of AoB-1-TW4. A second AoB-2 has a threshold stream weight of AoB-2-TW1, a CPU-memory weight of AoB-2-TW2, a client weight of AoB-2-TW3, and a historical workload weight of AoB-2-TW4. And so forth.

As discussed, threshold weights are calculated based on the computing resources of a node hosting an AoB. Different AoB instances hosted on different nodes having different computing resources may have different thresholds for the same weight-categories.

Consider, as an example, a first node having been provisioned with a greater amount of resources than a second node. For example, the first node as compared to the second node may have more memory, processors, and so forth. The first node hosts a first AoB service. The second node hosts a second AoB service. The first AoB service may have higher threshold weights in regards to the number of streams it can support, the number client requests that can be served, read throughput, write throughput, and so forth as compared to the second AoB service because the first node hosting the first AoB service has been provisioned with a greater amount of compute resources as compared to the second node hosting the second AoB service. Threshold weights for the historical-workload-weight category may be associated with times and dates corresponding to the times and dates of historical workloads processed by an AoB. An AoB hosted on a node having a greater amount of computing power than another node may be able to better handle both an expected workload and incoming client request as compared to an AoB hosted by the other node. Thus, a threshold historical-workload-weight for the node may be higher than a threshold historical-workload-weight for the other node.

FIG. 8 shows a table 805 collecting current values for the stream-weight category. In an embodiment, a periodic probe fetches each AoBs current stream utilization. The probe sets this weight to "low" if the observed value of current stream utilization is higher than the threshold stream utilization. The probe sets the weight to "high" if the observed value is lower than the threshold stream utilization.

In other words, the current stream utilization of an AoB is compared against a threshold stream utilization calculated for the AoB based on resources of a node hosting the AoB. If the current stream utilization of the AoB is above the threshold stream utilization calculated for the AoB, the stream-weight is set or marked as "low." If the current stream utilization of the AoB is below the threshold stream utilization calculated for the AoB, the stream-weight is set as "high."

In the example shown in FIG. 8, a stream-weight for first AoB-1 has been set as "high" because the current stream utilization for first AoB-1 is below the threshold stream utilization calculated for first AoB-1 based on compute resources of a node hosting first AoB-1. A stream-weight for second AoB-2 has been set as "low" because the current stream utilization for second AoB-2 is above the threshold stream utilization calculated for second AoB-2 based on compute resources of a node hosting second AoB-2. A stream-weight for third AoB-3 has been set as "low" because the current stream utilization for third AoB-3 is above the threshold stream utilization calculated for third AoB-3 based on compute resources of a node hosting third AoB-3.

FIG. 9 shows a table 905 collecting current values for the CPU-memory-weight category. In an embodiment, a periodic probe fetches each AoBs current CPU and memory utilization. The probe sets this weight to "low" if the observed value of CPU and memory utilization is higher than the threshold CPU and memory utilization. The probe sets the weight to "high" if the observed value is lower than the threshold CPU and memory utilization.

In other words, the current CPU and memory utilization of an AoB is compared against a threshold CPU and memory utilization calculated for the AoB based on resources of a node hosting the AoB. If the current CPU and memory utilization of the AoB is above the threshold CPU and memory utilization calculated for the AoB, the CPU-memory-weight is set or marked as "low." If the current CPU-memory-weight utilization of the AoB is below the threshold CPU-memory-weight utilization calculated for the AoB, the CPU-memory-weight is set as "high."

In the example shown in FIG. 9, a CPU-memory-weight for first AoB-1 has been set as "low" because the current CPU-memory-weight utilization for first AoB-1 is above the threshold CPU-memory-weight utilization calculated for first AoB-1 based on compute resources of a node hosting first AoB-1. A CPU-memory-weight for second AoB-2 has been set as "low" because the current CPU-memory-weight utilization for second AoB-2 is above the threshold CPU-memory-weight utilization calculated for second AoB-2 based on compute resources of a node hosting second AoB-2. A CPU-memory-weight for third AoB-3 has been set as "high" because the current CPU-memory-weight utilization for third AoB-3 is below the threshold CPU-memory-weight utilization calculated for third AoB-3 based on compute resources of a node hosting third AoB-3.

FIG. 10 shows a table 1005 collecting current values for the client-weight category. In an embodiment, a periodic probe fetches each AoBs current count of clients being served. The probe sets this weight to "low" if the observed value of client numbers is higher than the threshold count of clients. The probe sets the weight to "high" if the observed value is lower than the threshold count of clients.

In other words, the current client count of an AoB is compared against a threshold client count calculated for the AoB based on resources of a node hosting the AoB. If the current client count of the AoB is above the threshold client count calculated for the AoB, the client-weight is set or marked as "low." If the current client count of the AoB is below the threshold client count calculated for the AoB, the client-weight is set as "high."

In the example shown in FIG. 10, a client-weight for first AoB-1 has been set as "high" because the current client count for first AoB-1 is below the threshold client count calculated for first AoB-1 based on compute resources of a node hosting first AoB-1. A client-weight for second AoB-2 has been set as "low" because the current client count for second AoB-2 is above the threshold client count calculated for second AoB-2 based on compute resources of a node hosting second AoB-2. A client-weight for third AoB-3 has been set as "low" because the current client count for third AoB-3 is above the threshold client count calculated for third AoB-3 based on compute resources of a node hosting third AoB-3.

FIG. 11 shows a table 1105 collecting current values for the historical-workload-weight category. In an embodiment, a periodic probe fetches each AoBs historical workload, e.g., the historical workload served by an AoB. The probe sets this weight to "low" if the observed value of a current time and date falls within a time and date of the AoB's historical workload. The probe sets this weight to "high" if the observed value of the current time and date falls outside the time and date of the AoB's historical workload. In an embodiment, a periodic probe fetches the historical workload served by an AoB. The probe sets a corresponding weight to "low" if an observed value is higher than the threshold. The probe sets the corresponding weight to "high" if the observed value is lower than the threshold.

In an embodiment, each AoBs historical workloads or activities are tracked. The tracking includes recording the time and date of a workload including, for example, starting time and day, ending time and day, and duration. When a client issues a request for a filesystem operation, a time and day of the request is compared against a time and day of a historical workload. A request time that falls within the time and day of a historical workload of an AoB can indicate that the AoB is (or will be) overloaded because the AoB may need to dedicate resources to handling a new workload occurring at or about the same time and day as the historical workload.

In the example shown in FIG. 11, a historical-workload-weight for first AoB-1 has been set as "low" because a time of the client request falls within a time and day of historical workloads handled by first AoB-1. Consider, as an example, that the time of the client request is Sunday, 5:30 AM, and the historical workloads for first AoB-1 are Sundays from 4:00 AM-6:00 AM. In this case, the time of the request is within the historical workload for first AoB-1.

A historical-workload-weight for second AoB-2 has been set as "low" because a time of the client request falls within historical workloads handled by second AoB-2. Consider, as an example, that the historical workloads for second AoB-2 are Sundays from 3:00 AM-7:00 AM. In this case, the time of the request is again within the historical workload for second AoB-2.

A historical-workload-weight for third AoB-3 has been set as "low" because a time of the client request falls within historical workloads handled by third AoB-3. Consider, as an example, that the historical workloads for third AoB-3 are Sundays from 2:00 AM-6:00 AM. In this case, the time of the request is again within the historical workload for third AoB-3.

Figure 12:
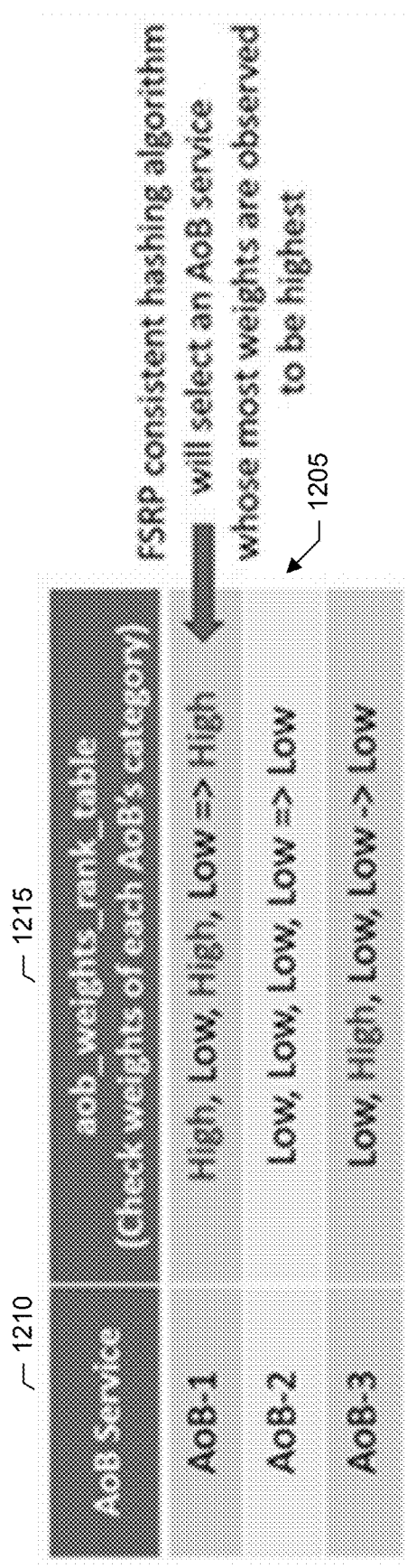
FIG. 12 shows a table with a ranking of access object services, according to one or more embodiments.

FIG. 12 shows a table 1205 holding final weights of each AoB service. The table may be referred to as an AoB weight rank table. A first column 1210 of the table lists the AoB services. A second column 1215 of the table lists the individual weights assigned to each category associated with the AoB service and a final weight of the AoB service. The final weight of the AoB service is derived from the individual weights assigned to each of the categories. In an embodiment, the final weight assigned to an AoB is determined by tallying the number of "low" weights, the number of "high" weights, and assigning the final weight based on which number is greatest. In case of a tie in the numbers, the system may be configured to default to a final weight of "high." In another embodiment, the default may be configured to "low."

In the example shown in FIG. 12, first AoB-1 is shown with the individual weights set on the categories. That is, the weights "high, low, high, and low" correspond to the categories stream (FIG. 8), CPU-memory (FIG. 9), client count (FIG. 10), and historical workload (FIG. 11), respectively, for first AoB-1. The total number of "low" weights is two. The total number of "high" weights is two. Thus, in this case, the final weight assigned to first AoB-1 is "high."

Second AoB-2 is likewise shown with the individual weights set on the categories. That is, the weights "low, low, low, and low" correspond to the categories stream (FIG. 8), CPU-memory (FIG. 9), client count (FIG. 10), and historical workload (FIG. 11), respectively, for second AoB-2. The total number of "low" weights is four. The total number of "high" weights is zero. Thus, in this case, the final weight assigned to second AoB-2 is "low."

Third AoB-3 is likewise shown with the individual weights set on the categories. That is, the weights "low, high, low, and low" correspond to the categories stream (FIG. 8), CPU-memory (FIG. 9), client count (FIG. 10), and historical workload (FIG. 11), respectively, for third AoB-3. The total number of "low" weights is three. The total number of "high" weights is one. Thus, in this case, the final weight assigned to second AoB-2 is "low."

In an embodiment, FSRP reviews the rank table and selects for redirection the AoB having a final weight of "high." In the example shown in FIG. 12, that AoB is first AoB-1. In an embodiment, the FSRP consistent hashing algorithm selects an AoB service having the most weights observed as "high."

Consider, as an example, that a hash of a file handle associated with a client request indicated that the client request should be redirected to second AoB-2 for processing (step 520, FIG. 5). The loading checks, however, indicate that weight on second AoB-2 is "low," while weight on first AoB-1 is "high." In this example, the client request is instead redirected to first AoB-1. That is, FSRP responds to the client with the IP address of first AoB-1 rather than second AoB-2. Load on an AoB can take priority over routing based on hashes of the file handles. In a case where all AoBs have the same final weights or loads, FSRP can default to redirecting the client request to the AoB as indicated via the hash of the file handle.

In an embodiment, the weights are binary values, e.g., "low" or "high." Distilling loadings associated with the AoB services into binary values facilitates the logic for selecting an AoB service for redirection. In another embodiment, the weights may include a spectrum or range of two or more values.

Table A below shows some pseudo code of the FSRP consistent hashing algorithm.

TABLE A

```
/* This local variable holds the threshold weights calculated
for each AoB based on the computed power of the node where the
AoB is deployed */ global category_weights_table
/* This local variable holds the final AoB weight rank table
which helps the algorithm select an AoB for redirection */
global aob_weights_rank_table
/*
```

TABLE A-continued

```
*         FSRP consistent hashing algorithm:
*         1. Hashes the input file-path/directory-path/su-name to
identify an AoB service   *    for redirection
*         2. For all AoBs, A periodic probe fetches CPU and Memory
utilization,
*         Availability of read/write/replication streams, Total
number of DDBoost
*         clients currently served by AoB, Current scale-out workload
and Historical
*         workload served earlier at that time of day  *   3. Check
if the AoB selected in step (1) has high value for all weights.
If yes,
*         return this AoB for redirection.
*         If not, then iterate through all the AoB until its able to
find AoBs with
*         maximum weights observed as High.
*/
function fsrpConsistentHashingAlgorithm(input: file-
path/directory-path/su-name,
input: AoB-list,
            output: selected-AoB-
name)       /*
*         Hash the input file-path/directory-path/su-name to identify
an AoB service
*         for redirection
            */
            Identify an AoB based on hash on input (input: file-
path/directory-path/su-name)
            /*
*         A periodic probe fetches CPU, memory utilization and
*         Update aob_weights_rank_table with weights
            value (High/Low)
*         observed for each AoB
            */
            Periodic probe invokes fetch_cpu_memory_utilization(input:
AoB-list)
            /*
*         A periodic probe fetches availability of
read/write/replication streams
*         Update aob_weights_rank_table with weights values
(High/Low)
*         observed for each AoB
            */
            Periodic probe invokes fetch_stream_availability(input:
AoB-list)
            /*
*         Similar methods where periodic probe gets total number of
DDBoost client
*         currently served by AoB, current scale-out workload and
historical workload
            */
            /*
*         Check if identified AoB is overloaded. If yes, iterate
through AoB list to
*         identify an AoB which is not overloaded.
            */
            Check for non-overloaded AoB(input: identified AoB, AoB-
list,
aob_weights_rank_table,
output: AoB selected for redirection)
            return the AoB details selected for redirection
end function
/*
*         A periodic probe fetches CPU, memory utilization and Update
            aob_weights_rank_table
*         with weights value (High/Low) observed for each AoB
*/
function fetch_cpu_memory_utilization(input: AoB-list)
            /* Holds the AoB weights calculated as per CPU and
memory availability */    var cpu-memory-weights
            /* For each AoB in the AoB-list: Fetch CPU and Memory
utilization */     for each AoB in the AoB list:
➢         Fetch the CPU utilization for the AoB
➢         Fetch the Memory utilization for the AoB
➢         Update the weight for the CPU and Memory utilization for
each AoB in local cpu-memory-weights. This weight is set to low
if fetched value is higher than threshold and set the weight to
high if observed value is lower than threshold
            end for
            /* Update the global aob_weights_rank_table */
```

TABLE A-continued

Set the calculated weights (High/Low) in the cpu-memory-
weights to the existing
    AoB weights in the global aob_weights_rank_table end
function In an embodiment, rather than using a simple round-robin method to balance the data protection traffic among the AoB service in a scale-out data protection appliance, a technique, as discussed, uses a consistent hashing algorithm which utilizes multiple weights which will enable the filesystem redirector and proxy (FSRP) service to avoid overloading any of the access object (AoB) services running on the appliance and thus boosting the performance of the data protection appliance. In a cluster made up of heterogeneous nodes, the load is distributed relative to these computational differences. Techniques provide a method of balancing between nodes in a cluster to avoid reaching per-node fixed resource limits (e.g. streams). Resource-based load-balancing of nodes within the cluster can remain transparent to clients. This helps to simplify the client logic.

The load-balancing technique of the filesystem redirector and proxy service considers and examines file hash range mappings, multiple different types of loadings that an access object service may be handling, historical workloads, and resources of the hosting node to make a determination as to whether or not the access object service is overloaded and make a selection of an access object service. This technique allows for taking advantage of cached information while also helping to ensure that an operation is not redirected to a service that is or is likely to be overloaded.

Setting a weight on a category as "low" when a corresponding threshold has been exceeded and setting as "high" when the corresponding threshold has not been exceeded is merely an example of one particular embodiment. In other embodiments, a different or opposite convention may instead be used. For example, in another embodiment, weight on a category may be set as "low" when a corresponding threshold has not been exceeded and the weight may be set as "high" when the corresponding threshold has been exceeded. One of skill in the art will recognize that different labels or conventions may be used that give the same functionality.

In an embodiment, a method includes: associating a plurality of categories to each access object (AoB) service of a plurality of AoB services of a deduplication filesystem hosted across a cluster of nodes, the categories describing loadings on the AoB services; making a preliminary identification of an AoB service to which a client request should be redirected; checking the loadings on the AoB service, the checking comprising: calculating thresholds for the categories; observing current values for each category; comparing the current values against the thresholds; setting individual weights on the categories based on the comparison; and deriving a final weight on the AoB service based on the individual weights; if the final weight indicates that the AoB service is not overloaded, redirecting the request to the AoB service; and if the final weight indicates that the AoB service is overloaded, iterating the checking the loadings over a next AoB service to find an AoB service that is not overloaded.

The categories may include a first category indicating a number of streams associated with the AoB service, a second category indicating compute resource utilization associated with the AoB service, a third category indicating a number of client requests associated with the AoB service, a fourth category indicating workload associated with the AoB service, and a fifth category indicating historical workloads associated with the AoB service.

In an embodiment, the thresholds calculated for the categories are based on compute resources of a node where the AoB service is deployed. Making the preliminary identification may include hashing a file handle of a file identified in the client request and cross-referencing a hash value from the hashing against a mapping of hash ranges to the plurality of AoB services, each AoB service being responsible a respective hash range.

In an embodiment, the filesystem comprises files represented by tree data structures, the AoB services being responsible for operations involving upper levels of the tree data structures. In an embodiment, the method includes: periodically conducting the checking of the loadings for each AoB service, the periodic checking being independent of client requests for filesystem operations.

In another embodiment, there is a system comprising: a processor; and memory configured to store one or more sequences of instructions which, when executed by the processor, cause the processor to carry out the steps of: associating a plurality of categories to each access object (AoB) service of a plurality of AoB services of a deduplication filesystem hosted across a cluster of nodes, the categories describing loadings on the AoB services; making a preliminary identification of an AoB service to which a client request should be redirected; checking the loadings on the AoB service, the checking comprising: calculating thresholds for the categories; observing current values for each category; comparing the current values against the thresholds; setting individual weights on the categories based on the comparison; and deriving a final weight on the AoB service based on the individual weights; if the final weight indicates that the AoB service is not overloaded, redirecting the request to the AoB service; and if the final weight indicates that the AoB service is overloaded, iterating the checking the loadings over a next AoB service to find an AoB service that is not overloaded.

In another embodiment, there is a computer program product, comprising a non-transitory computer-readable medium having a computer-readable program code embodied therein, the computer-readable program code adapted to be executed by one or more processors to implement a method comprising: associating a plurality of categories to each access object (AoB) service of a plurality of AoB services of a deduplication filesystem hosted across a cluster of nodes, the categories describing loadings on the AoB services; making a preliminary identification of an AoB service to which a client request should be redirected; checking the loadings on the AoB service, the checking comprising: calculating thresholds for the categories; observing current values for each category; comparing the current values against the thresholds; setting individual weights on the categories based on the comparison; and deriving a final weight on the AoB service based on the individual weights; if the final weight indicates that the AoB service is not overloaded, redirecting the request to the AoB service; and if the final weight indicates that the AoB service is overloaded, iterating the checking the loadings over a next AoB service to find an AoB service that is not overloaded.

Referring back now to FIG. 1, the clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

In an embodiment, the clients may be referred to as backup clients. In this embodiment, the filesystem provides a backup target for data generated by the clients. The backups are secondary copies that can be used in the event that primary file copies on the clients become unavailable due to, for example, data corruption, accidental deletion, natural disaster, data breaches, hacks, or other data loss event. The backups may be stored in a format such as a compressed format, deduplicated format, or encrypted format that is different from the native source format. In an embodiment, the filesystem is hosted by a cluster of nodes (e.g., two or more nodes). Depending on demand, cluster nodes or services may be dynamically scaled up or down. Thus, the cluster may be referred to as a scale out cluster. For example, as part of on-going operations, new nodes or new instances of a service may be added to the cluster or existing nodes or instances of a service may be removed from the cluster.

Figure 13:
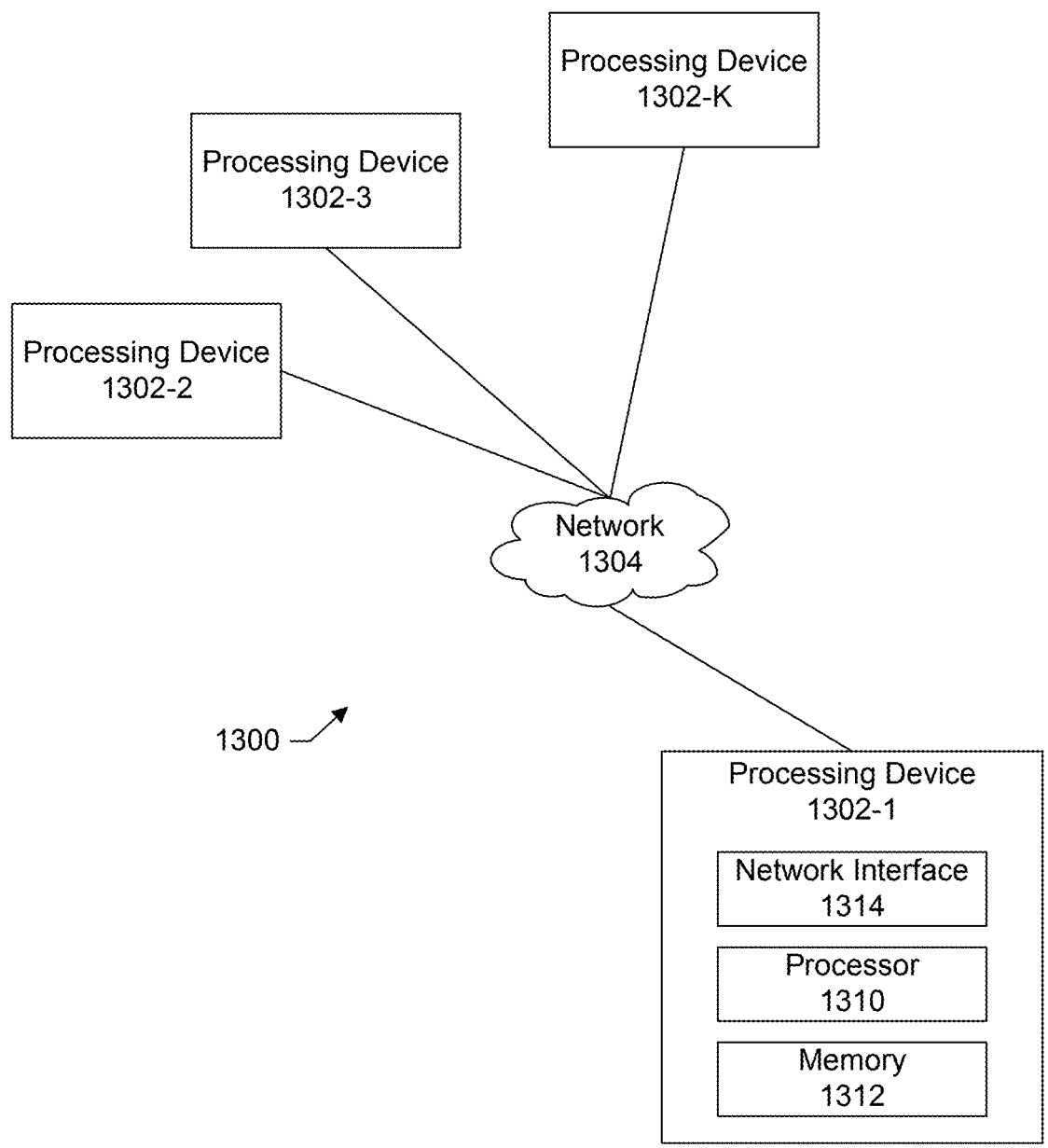
FIG. 13 shows a block diagram of a processing platform that may be utilized to implement at least a portion of an information processing system, according to one or more embodiments.

FIG. 13 shows an example of a processing platform 1300 that may include at least a portion of the information handling system shown in FIG. 1. The example shown in FIG. 13 includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 14:
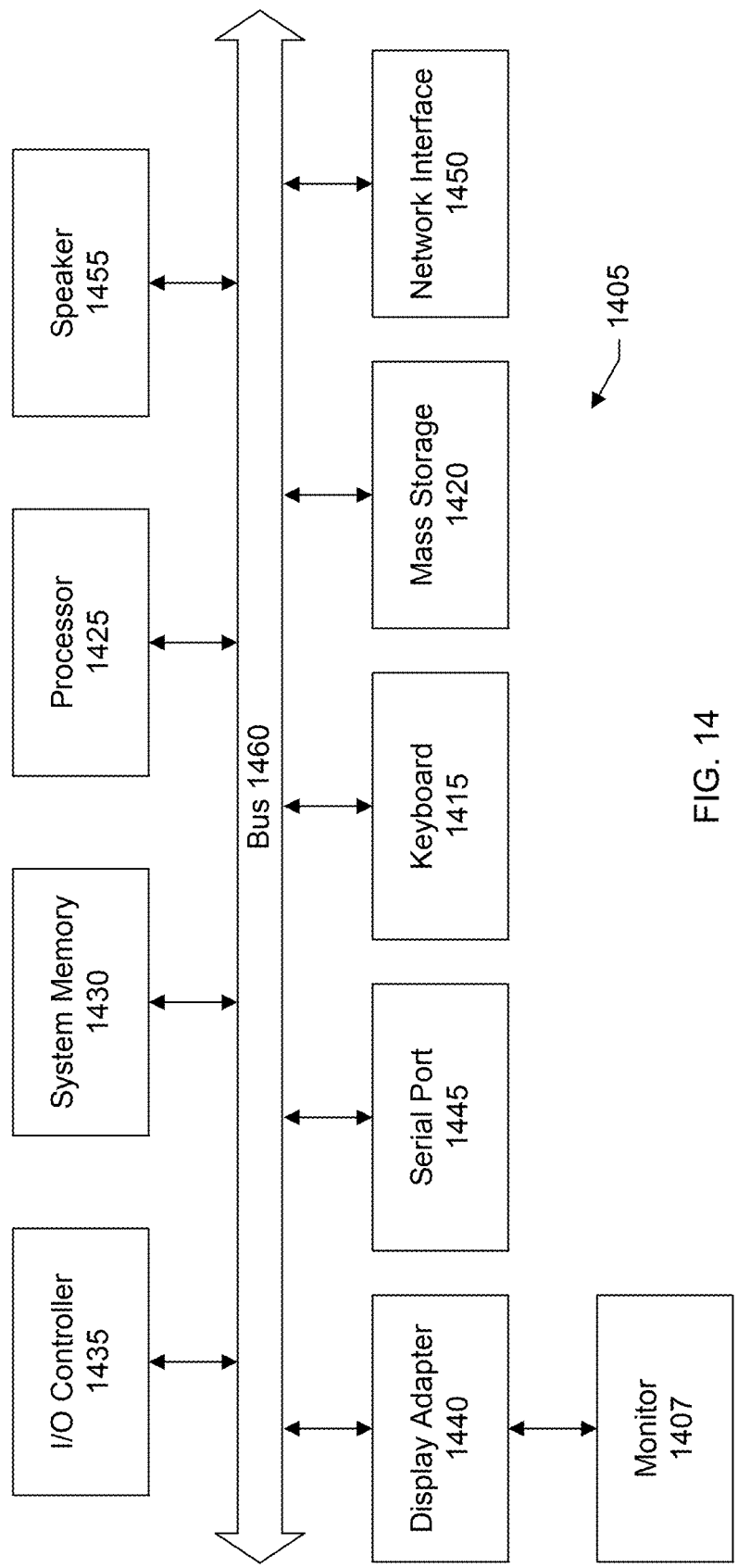
FIG. 14 shows a block diagram of a computer system suitable for use with the system, according to one or more embodiments.

FIG. 14 shows a system block diagram of a computer system 1405 used to execute the software of the present system described herein. The computer system includes a monitor 1407, keyboard 1415, and mass storage devices 1420. Computer system 1405 further includes subsystems such as central processor 1425, system memory 1430, input/output (I/O) controller 1435, display adapter 1440, serial or universal serial bus (USB) port 1445, network interface 1450, and speaker 1455. The system may also be used with computer systems with additional or fewer subsystems. For example, a computer system could include more than one processor 1425 (i.e., a multiprocessor system) or a system may include a cache memory.

Arrows such as 1460 represent the system bus architecture of computer system 1405. However, these arrows are illustrative of any interconnection scheme serving to link the subsystems. For example, speaker 1455 could be connected to the other subsystems through a port or have an internal direct connection to central processor 1425. The processor may include multiple processors or a multicore processor, which may permit parallel processing of information. Computer system 1405 shown in FIG. 14 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    associating a plurality of categories of a consistent hashing algorithm to each access object (AoB) service of a plurality of AoB services of a deduplication filesystem hosted across a cluster of nodes, the categories describing loadings on the AoB services;
    making, by a file system redirector and proxy (FSRP) service executing the consistent hashing algorithm, a preliminary identification of an AoB service to which a client request should be redirected based on a hash of a file path associated with the client request;
    checking, by the FSRP service and according to the consistent hashing algorithm, the loadings on the AoB service, the checking comprising:
        calculating thresholds for the categories;
        observing current values for each category;
        comparing the current values against the thresholds;
        setting individual weights on the categories based on the comparison; and
        deriving a final weight on the AoB service based on the individual weights;
    if the final weight indicates that the AoB service is not overloaded, redirecting, by the FSRP service, the request to the AoB service; and
    if the final weight indicates that the AoB service is overloaded, iterating, by the FSRP service, the checking the loadings over a next AoB service to find an AoB service that is not overloaded.

2. The method of claim 1 wherein the categories comprise a first category indicating a number of streams associated with the AoB service, a second category indicating compute resource utilization associated with the AoB service, a third category indicating a number of client requests associated with the AoB service, a fourth category indicating workload associated with the AoB service, and a fifth category indicating historical workloads associated with the AoB service.

3. The method of claim 1 wherein the thresholds calculated for the categories are based on compute resources of a node where the AoB service is deployed.

4. The method of claim 1 wherein the making the preliminary identification comprises hashing a file handle of a file identified in the client request and cross-referencing a hash value from the hashing against a mapping of hash ranges to the plurality of AoB services, each AoB service being responsible a respective hash range.

5. The method of claim 1 wherein the filesystem comprises files represented by tree data structures, the AoB services being responsible for operations involving upper levels of the tree data structures.

6. The method of claim 1 further comprising:
periodically conducting the checking of the loadings for each AoB service, the periodic checking being independent of client requests for filesystem operations.

7. A system comprising: a processor; and memory configured to store one or more sequences of instructions which, when executed by the processor, cause the processor to carry out the steps of:
associating a plurality of categories of a consistent hashing algorithm to each access object (AoB) service of a plurality of AoB services of a deduplication filesystem hosted across a cluster of nodes, the categories describing loadings on the AoB services;
making, by a file system redirector and proxy (FSRP) service executing the consistent hashing algorithm, a preliminary identification of an AoB service to which a client request should be redirected based on a hash of a file path associated with the client request;
checking, by the FSRP service and according to the consistent hashing algorithm, the loadings on the AoB service, the checking comprising:
calculating thresholds for the categories;
observing current values for each category;
comparing the current values against the thresholds;
setting individual weights on the categories based on the comparison; and
deriving a final weight on the AoB service based on the individual weights;
if the final weight indicates that the AoB service is not overloaded, redirecting, by the FSRP service, the request to the AoB service; and
if the final weight indicates that the AoB service is overloaded, iterating, by the FSRP service, the checking the loadings over a next AoB service to find an AoB service that is not overloaded.

8. The system of claim 7 wherein the categories comprise a first category indicating a number of streams associated with the AoB service, a second category indicating compute resource utilization associated with the AoB service, a third category indicating a number of client requests associated with the AoB service, a fourth category indicating workload associated with the AoB service, and a fifth category indicating historical workloads associated with the AoB service.

9. The system of claim 7 wherein the thresholds calculated for the categories are based on compute resources of a node where the AoB service is deployed.

10. The system of claim 7 wherein the making the preliminary identification comprises hashing a file handle of a file identified in the client request and cross-referencing a hash value from the hashing against a mapping of hash ranges to the plurality of AoB services, each AoB service being responsible a respective hash range.

11. The system of claim 7 wherein the filesystem comprises files represented by tree data structures, the AoB services being responsible for operations involving upper levels of the tree data structures.

12. The system of claim 7 wherein the processor further carries out the step of:
periodically conducting the checking of the loadings for each AoB service, the periodic checking being independent of client requests for filesystem operations.

13. A computer program product, comprising a non-transitory computer-readable medium having a computer-readable program code embodied therein, the computer-readable program code adapted to be executed by one or more processors to implement a method comprising:
associating a plurality of categories of a consistent hashing algorithm to each access object (AoB) service of a plurality of AoB services of a deduplication filesystem hosted across a cluster of nodes, the categories describing loadings on the AoB services;
making, by a file system redirector and proxy (FSRP) service executing the consistent hashing algorithm, a preliminary identification of an AoB service to which a client request should be redirected based on a hash of a file path associated with the client request;
checking, by the FSRP service, the loadings on the AoB service, the checking comprising:
calculating thresholds for the categories;
observing current values for each category;
comparing the current values against the thresholds;
setting individual weights on the categories based on the comparison; and
deriving a final weight on the AoB service based on the individual weights;
if the final weight indicates that the AoB service is not overloaded, redirecting, by the FSRP service, the request to the AoB service; and
if the final weight indicates that the AoB service is overloaded, iterating, by the FSRP service, the checking the loadings over a next AoB service to find an AoB service that is not overloaded.

14. The computer program product of claim 13 wherein the categories comprise a first category indicating a number of streams associated with the AoB service, a second category indicating compute resource utilization associated with the AoB service, a third category indicating a number of client requests associated with the AoB service, a fourth category indicating workload associated with the AoB service, and a fifth category indicating historical workloads associated with the AoB service.

15. The computer program product of claim 13 wherein the thresholds calculated for the categories are based on compute resources of a node where the AoB service is deployed.

16. The computer program product of claim 13 wherein the making the preliminary identification comprises hashing a file handle of a file identified in the client request and cross-referencing a hash value from the hashing against a mapping of hash ranges to the plurality of AoB services, each AoB service being responsible a respective hash range.

17. The computer program product of claim 13 wherein the filesystem comprises files represented by tree data structures, the AoB services being responsible for operations involving upper levels of the tree data structures.

18. The computer program product of claim 13 wherein the method further comprises:
periodically conducting the checking of the loadings for each AoB service, the periodic checking being independent of client requests for filesystem operations.

* * * * *